US012500785B2

United States Patent
Takalikar et al.

(10) Patent No.: US 12,500,785 B2
(45) Date of Patent: Dec. 16, 2025

(54) AUTOMATED SESSION RECORDING FOR ABSENT PARTICIPANTS

(71) Applicant: Avaya Management L.P., Durham, NC (US)

(72) Inventors: Aonkar Balkrushna Takalikar, Pune (IN); Sudhir Shelke, Pune (IN)

(73) Assignee: Avaya Management L.P., Morristown, NJ (US)

( * ) Notice: Subject to any disclaimer, the term of this patent is extended or adjusted under 35 U.S.C. 154(b) by 349 days.

(21) Appl. No.: 17/357,582

(22) Filed: Jun. 24, 2021

(65) Prior Publication Data

US 2022/0417048 A1 Dec. 29, 2022

(51) Int. Cl.
*H04L 12/18* (2006.01)
*H04L 29/08* (2006.01)
*H04L 67/50* (2022.01)
*H04L 67/54* (2022.01)

(52) U.S. Cl.
CPC ...... *H04L 12/1822* (2013.01); *H04L 12/1818* (2013.01); *H04L 12/1831* (2013.01); *H04L 67/535* (2022.05); *H04L 67/54* (2022.05)

(58) Field of Classification Search
CPC ............. H04L 12/1822; H04L 12/1818; H04L 12/1831; H04L 67/22; H04L 67/24
See application file for complete search history.

(56) References Cited

U.S. PATENT DOCUMENTS

| 9,253,330 B2* | 2/2016 | Boss ................. H04M 3/56 |
| 9,392,234 B2* | 7/2016 | Beerse ................ H04N 7/183 |
| 10,403,287 B2* | 9/2019 | Dhoot ................ H04M 3/569 |
| 2005/0137930 A1 | 6/2005 | Hung |
| 2006/0200374 A1 | 9/2006 | Nelken |
| 2007/0263603 A1* | 11/2007 | Schmitt ............ H04L 12/1831 370/356 |
| 2008/0195512 A1 | 8/2008 | Klebanoff et al. |
| 2019/0392395 A1* | 12/2019 | Valliani ............. H04M 3/565 |

OTHER PUBLICATIONS

Call and online meeting bots, Nov. 10, 2021. 5 pages. Downloaded from "https://docs.microsoft.com/en-us/microsoftteams/platform/bots/calls-and-meetings/calls-meetings-bots-overview," on Dec. 20, 2021.

* cited by examiner

*Primary Examiner* — Nazia Naoreen

(57) ABSTRACT

The technology disclosed herein enables recording of user communications during a communication session on behalf of a user who is unable to attend. In a particular embodiment, a method includes identifying a meeting at a meeting time when a user is unable to attend. In an automated recording system, the method includes joining a communication session for the meeting as an endpoint at the meeting time. During the communication session, the method includes receiving user communications in the automated recording system from other endpoints on the communication session. After receiving the user communications, the method includes storing the user communications to a storage system.

20 Claims, 8 Drawing Sheets

AUTOMATED SESSION RECORDING FOR ABSENT PARTICIPANTS

TECHNICAL BACKGROUND

In environments where collaboration and communication between individuals is important, such as between colleagues at an enterprise, it is important for other individuals to be aware of when someone is going to absent, or otherwise unavailable, at certain times. The absence can then be accounted for when executing their own duties. For instance, if the absent individual is required for a particular task, the other individuals may schedule a completion time for that task when the absent individual is not absent. Likewise, the individual themselves may reschedule tasks, meetings, etc. for times when they will be available. However, there may be situations where certain things, such as meetings, cannot be rescheduled and the absent individual may miss something important while they are gone.

SUMMARY

The technology disclosed herein enables recording of user communications during a communication session on behalf of a user who is unable to attend. In a particular embodiment, a method includes identifying a meeting at a meeting time when a user is unable to attend. In an automated recording system, the method includes joining a communication session for the meeting as an endpoint at the meeting time. During the communication session, the method includes receiving user communications in the automated recording system from other endpoints on the communication session. After receiving the user communications, the method includes storing the user communications to a storage system.

In some embodiments, joining the communication session comprises joining the communication session using access credentials for the user.

In some embodiments, the method includes identifying the automated recording system as representing the user to other users at the other endpoints.

In some embodiments, after storing the user communications, the method includes receiving a request from the user to access the user communications and providing the user communications to the user in response to the request.

In some embodiments, identifying the meeting comprises receiving a timeframe for when the user is unavailable and determining whether to reschedule one or more items scheduled during the timeframe, wherein the meeting is one of the items. In response to determining that the meeting cannot be rescheduled, the method includes determining that the automated recording system should join the communication session. In those embodiments, determining that the automated recording system should join the communication session may comprise receiving user input from the user instructing the automated recording system to join the communication session. Also, in response to determining that a first item of the items can be rescheduled, the method may include rescheduling the first item to a time outside of the timeframe. The method may also include updating a presence status of the user to indicate that the user is unavailable during the timeframe.

In some embodiments, the meeting time comprises a time during the meeting that is predetermined to be associated with the user.

In some embodiments, the automated recording system comprises a user system operated by the user.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to identify a meeting at a meeting time when a user is unable to attend and join a communication session for the meeting as an endpoint at the meeting time. During the communication session, the program instructions direct the processing system to receive user communications in the automated recording system from other endpoints on the communication session. After receiving the user communications, the program instructions direct the processing system to store the user communications to a storage system.

DETAILED DESCRIPTION

The automated recording systems described below automatically identify one or more meetings that a user is unable to attend and records the user communications from those meetings. When the user is available to do so, the user can access the recording of a meeting to catch whatever they missed. In some cases, an automated recording system is also able to automatically reschedule calendar entries (e.g., meetings, appointments, etc.), tasks, or other types of time dependent items. If a meeting can be rescheduled to when the user can attend, then the automated recording system does not need to record the meeting. In further examples, an automated recording system may be notify other users about the user being unavailable for a designated time. For instance, the automated recording system may update the user's email signature, email auto-reply, presence status on a communication platform, etc. to indicate when the user is unavailable. Thus, not only is the automated recording system able to assist the user while they are, or are going to be, unavailable, the system can help notify others about the user's availability.

Figure 1:
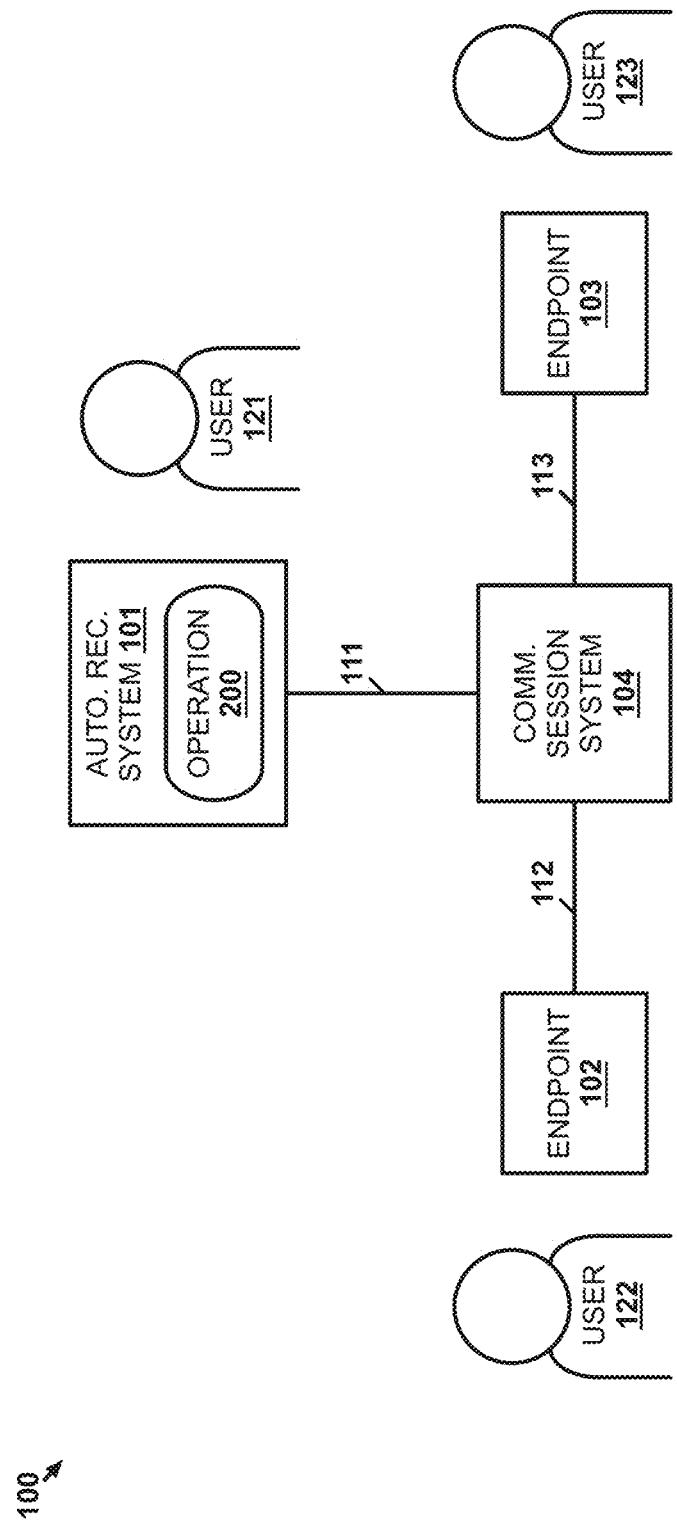
FIG. 1 illustrates an implementation for recording user communications on behalf of an absent user.

FIG. 1 illustrates implementation 100 for recording user communications on behalf of an absent user. Implementation 100 includes automated recording system 101, endpoint 102, endpoint 103, and communication session system 104. User 122 operates endpoint 102 and user 123 operates endpoint 103. User 121 is shown as operating automated recording system 101. User 121 may operate automated recording system 101 directly if automated recording system 101 is a user system, like endpoints 102 and 103 are, or user 121 may control automated recording system 101 through a user system in communication with automated recording system 101. Alternatively, automated recording system 101 may operate on user 121's behalf without explicit direction from user 121. Automated recording system 101 and communication session system 104 communicate over communication link 111. Endpoint 102 and communication session system 104 communicate over communication link 112. Endpoint 103 and communication session system 104 communicate over communication link 113.

Communication links 111-112 are shown as direct links but may include intervening systems, networks, and/or devices.

In operation, endpoint 102 and endpoint 103 may each respectively be a telephone, tablet computer, laptop computer, desktop computer, conference room system, or some other type of computing device capable of connecting to a communication session facilitated by communication session system 101. Communication session system 104 facilitates communication sessions between two or more endpoints, such as endpoint 102 and endpoint 103. In some examples, communication session system 104 may be omitted in favor of a peer-to-peer communication session between endpoint 102 and endpoint 103. A communication session may be audio only (e.g., a voice call) or may also include a video component (e.g., a video call), a graphic component (e.g., presentation slides, screen sharing, etc.), text chat component, and/or some other type of real-time communication. During a communication session, user 122 and user 123 are able to speak with, or to, one another by way of their respective endpoints 102 and 103 capturing their voices and transferring the voices over the communication session. Other examples may include more than two participants and/or more than two endpoints on the communication session.

Automated recording system 101 is also connected to communication session system 104 so that automated recording system 101 can receive the user communications exchanged between endpoint 102 and endpoint 103. While not necessarily a user system like endpoints 102 and 103 (e.g., automated recording system 101 may be a remote server or other type of computing system), automated recording system 101 is capable of joining the communication session between endpoint 102 and endpoint 103 as another endpoint to that communication session. As such, even if user 121 is unable to join user 122 and user 123 to communicate over the communication session, automated recording system 101 still receives the user communications for recording, as discussed below.

Figure 2:
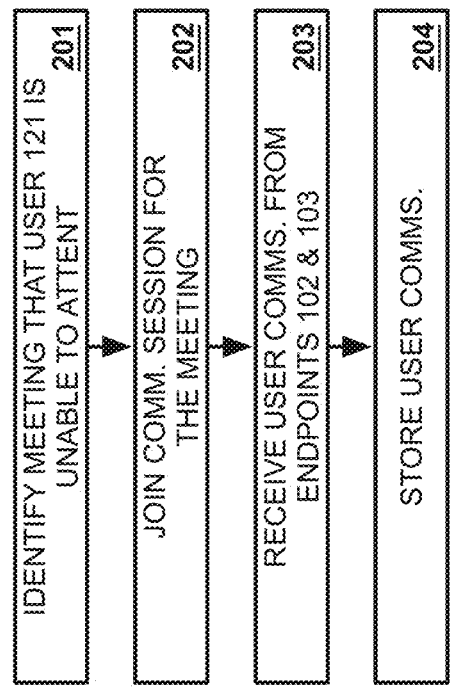
FIG. 2 illustrates an operation to record user communications on behalf of an absent user.

FIG. 2 illustrates operation 200 to record user communications on behalf of an absent user. During operation 200, automated recording system 101 identifies a meeting at a meeting time when user 121 is unable to attend (201). Identifying the meeting at least identifies a meeting time for the meeting (i.e., when the meeting will occur) and identifying information for joining a communication session for the meeting. The meeting time may be for the meeting as a whole or for a portion of the meeting that is relevant to user 121. The identifying information may include a link (e.g., uniform resource locator) to join the communication session, security information (e.g., passcode needed to join), a phone number for the communication session, or some other information relevant to automated recording system 101's ability to join the communication session. User 121 may explicitly inform automated recording system 101 about the meeting (e.g., via input directly into automated recording system 101 or through another user system operated by user 121) or automated recording system 101 may identify the meeting using information about user 121's schedule. For example, user 121 may notify automated recording system 101 about an upcoming timeframe when they will be unavailable (e.g., on vacation) and then automated recording system 101 may identify the meeting as being within that timeframe, which may require automated recording system 101 have access to user 121's electronic calendar having an entry for the meeting. Similarly, user 121 may block off the timeframe directly in their calendar and automated recording system 101 may be notified by the electronic calendar (e.g., through a push notification or by synchronizing with the electronic calendar), or otherwise recognizes the addition of the blocked-off timeframe, and then identifies the meeting being within that timeframe.

After identifying the meeting, automated recording system 101 joins a communication session for the meeting as an endpoint at the meeting time (202). Automated recording system 101 joins the communication session using communication protocols supported by communication session system 104. If communication session system 104 requires a proprietary client application be executing on an endpoint to connect to the communication session (e.g., an application natively executing on the endpoint or a web-based application executing through a web browser on the endpoint), then automated recording system 101 may execute the client application for the purposes of joining the communication session. In some examples, automated recording system 101 may log into the client application using user credentials of user 121 (e.g., username and password), which may be provided by user 121 prior to the meeting time or may be included in the identifying information for the meeting. Alternatively, if communication session system 104 allows dialing into the communication session using a phone number, the automated recording system 101 may dial into the communication session over a telephone network. Although, in those examples, nothing other than audio user communications may be received. Automated recording system 101 may identify itself on the communication session as being user 121, as being an automated recording system, as being an automated recording system on behalf of user 121, or may be identified to user 122 and user 123 in some other manner. For example, a participant list displayed at endpoint 102 may show a name of user 123 and a name of user 121 with an indication that automated recording system 101 is joining on their behalf.

During the communication session, automated recording system 101 receives user communications from endpoints 102 and 103 on the communication session (203). Since automated recording system 101 has joined the communication session as an endpoint, automated recording system 101 receives the user communications in the same manner any other endpoint (e.g., endpoint 102 and endpoint 103) would receive those user communications. The user communications may include audio, video, presentation visuals, screen sharing visuals, text based messages, or some other type of real-time communications. The type of user communications received may depend on the capabilities of communication session system 104, settings for the communication session (e.g., whether video, slide presentation, or screen sharing is enabled), a connection of automated recording system 101 to the communication session (e.g., using a client application or call through telephone network), and/or some other factor related to the communication session or endpoints connected thereto.

After receiving the user communications, automated recording system 101 stores the user communications to a storage system (204). The storage system may include one or more volatile and/or non-volatile memory, such as random access memory, flash memory, hard disk drives, solid state drives, tape drives/cartridges, optical drives/media, and/or some other computer-accessible data storage device. In no examples would the storage system be considered a mere propagated signal. The storage system may be internal to automated recording system 101, may be connected to automated recording system 101 over a local area network, may be a remote storage system (e.g., cloud storage system) connected to automated recording system 101 over a wide area network, such as the Internet, or may be a storage system accessible to automated recording system 101 in some other manner. The user communications may be stored in the format in which they are received (e.g., allowed to remain encoded) or may be reformatted (e.g., transcoded or modified in some other manner). In some cases, user communications from endpoint 102 may be received in a separate stream than user communications from endpoint 103. For instance, a video stream of user 122 may be received from endpoint 102 and a video stream of user 123 may be received from endpoint 103. While a client application window on an endpoint may simply display both video streams therein, automated recording system 101 may store the video streams separately or may combine the video images from the streams into a single stream for storage. In an example of the latter, automated recording system 101 may scale the images and arrange them into a single video image (e.g., may place the images side by side, picture in picture, or tiled in some other manner). In some examples, automated recording system 101 may be configured (e.g., by default, at the instruction of user 121, at the instruction of an administrator, or otherwise) to only record certain types of user communications (e.g., record only audio even though the communication session is a video session).

After the user communications are stored, user 121 can access the stored user communications for playback when they are available to do so. User 121 may operate a user system, which may be automated recording system 101 itself in some cases, to retrieve the stored user communications and play the user communications back to user 121. The user system may be able to access the user communication directly on the storage system or may request the user communications through automated recording system 101. In some examples, the user system may execute a client application having the capabilities to interact with automated recording system 101 or otherwise retrieve and playback the stored user communications. Alternatively, the user communications may be stored in a standardized format that can be played by any system capable of playing the standardized format. For example, the user communications may be stored in a standard audio (e.g., mp3) or video (e.g., h.264) format that can be played by a majority of media player applications. In some examples, automated recording system 101 may automatically send the user communications, or an access link (e.g., URL) thereto, once the user communications have been stored. For example, after the communication session has ended, automated recording system 101 may email the user communications to an email address associated with user 121.

Figure 3:
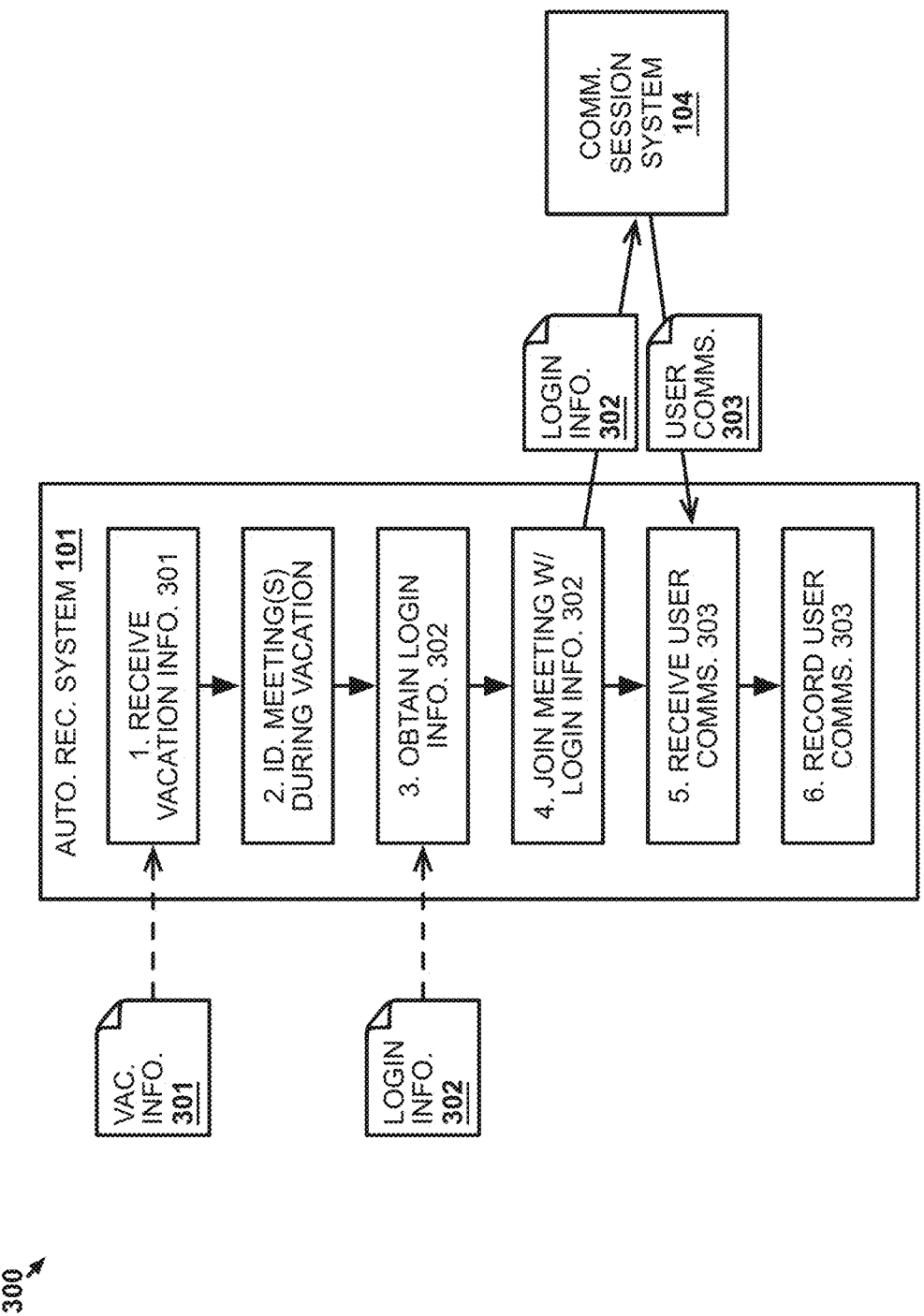
FIG. 3 illustrates an operational scenario for recording user communications on behalf of an absent user.

FIG. 3 illustrates operational scenario 300 for recording user communications on behalf of an absent user. Operational scenario 300 is an example of how automated recording system 101 may record user communications. In operational scenario 300, automated recording system 101 receives vacation information 301 at step 1. Vacation information 301 may be received directly from user 121 (e.g., through a user interface of automated recording system 101 or a user interface of a user system in communication with automated recording system 101) or indirectly (e.g., by identifying a vacation block in a calendar of user 121). Vacation information 301 at least indicates a start time and an end time for user 121's vacation. Based on vacation information 301, automated recording system 101 identifies one or more meetings that user 121 has scheduled during their vacation at step 2. Automated recording system 101 may access an electronic calendar to identify the meetings or automated recording system 101 may be provided with user 121's meeting schedule in some other manner. The meetings are meetings that can be attended via a communication session that automated recording system 101 is capable of joining. In this example, given any necessary credentials, automated recording system 101 is capable of joining communication sessions facilitated by communication session system 104. Although, automated recording system 101 may be capable of joining other types of communication systems as well.

Automated recording system 101 also obtains login information 302 at step 3. Login information 302 includes any information that automated recording system 101 will need to join the communication session for one or more of the identified meetings. For example, login information 302 may include access credentials for user 121 to identify themselves to communication session system 104 and/or access credentials (e.g., passcode) for the communication session itself. Automated recording system 101 may request login information 302 from user 121 prior to the start of their vacation or may obtain login information 302 from another source, such as a profile for user 121 that includes login information 302.

When the meeting time arrives, automated recording system 101 joins a communication session for the meeting on behalf of user 121 at step 4 using login information 302. In some examples, login information 302 indicates that automated recording system 101 is joining on behalf of user 121 (e.g., automated recording system 101 may log into communication session system 104 using user 121's credentials) or automated recording system 101 may indicate that it is joining the communication session on behalf of user 121 in some other manner. In some examples, a client application may request that a user provide a name to be displayed to other participants. If automated recording system 101 joins the communication session using such a client, then automated recording system 101 may enter user 121's name in that field, possibly along with an indication that automated recording system 101 is representing user 121.

After joining the communication session, automated recording system 101 begins receiving real-time user communications 303 at step 5. User communications 303 are communications between user 122 and user 123. For example, when user 123 speaks, endpoint 103 captures that speech and transmits it over the communication session to endpoint 102 and automated recording system 101, which are the other endpoints on the communication session. User communications may also include video, text, or other types of information discussed elsewhere herein. Upon receipt of user communications 303, automated recording system 101 recorded user communications 303 by storing user communications 303 to a storage system either built into automated recording system 101 or otherwise accessible to automated recording system 101. In some examples, automated recording system 101 may capture user communications 303 as user communications 303 are being output. For instance, a client application is used by automated recording system 101 to receive user communications 303 and the client application does not allow access to user communications by external applications (e.g., an application directing automated recording system 101 to perform operation 200 using the client), then automated recording system 101 may be configured to capture the output from the client application to record user communications 303. In some cases, automated recording system 101 may perform a screen recording on a window of the client application to capture any information displayed for the communication session (e.g., video of user 122 and user 123), and may capture audio being sent to an audio output device by the client application, even if automated recording system 101 does not actually have a display or audio output device connected thereto. Regardless of the manner in which automated recording system 101 records user communications 303, after user communications 303 are recorded, user 121 can access user communications 303 when they are available to do so.

Figure 4:
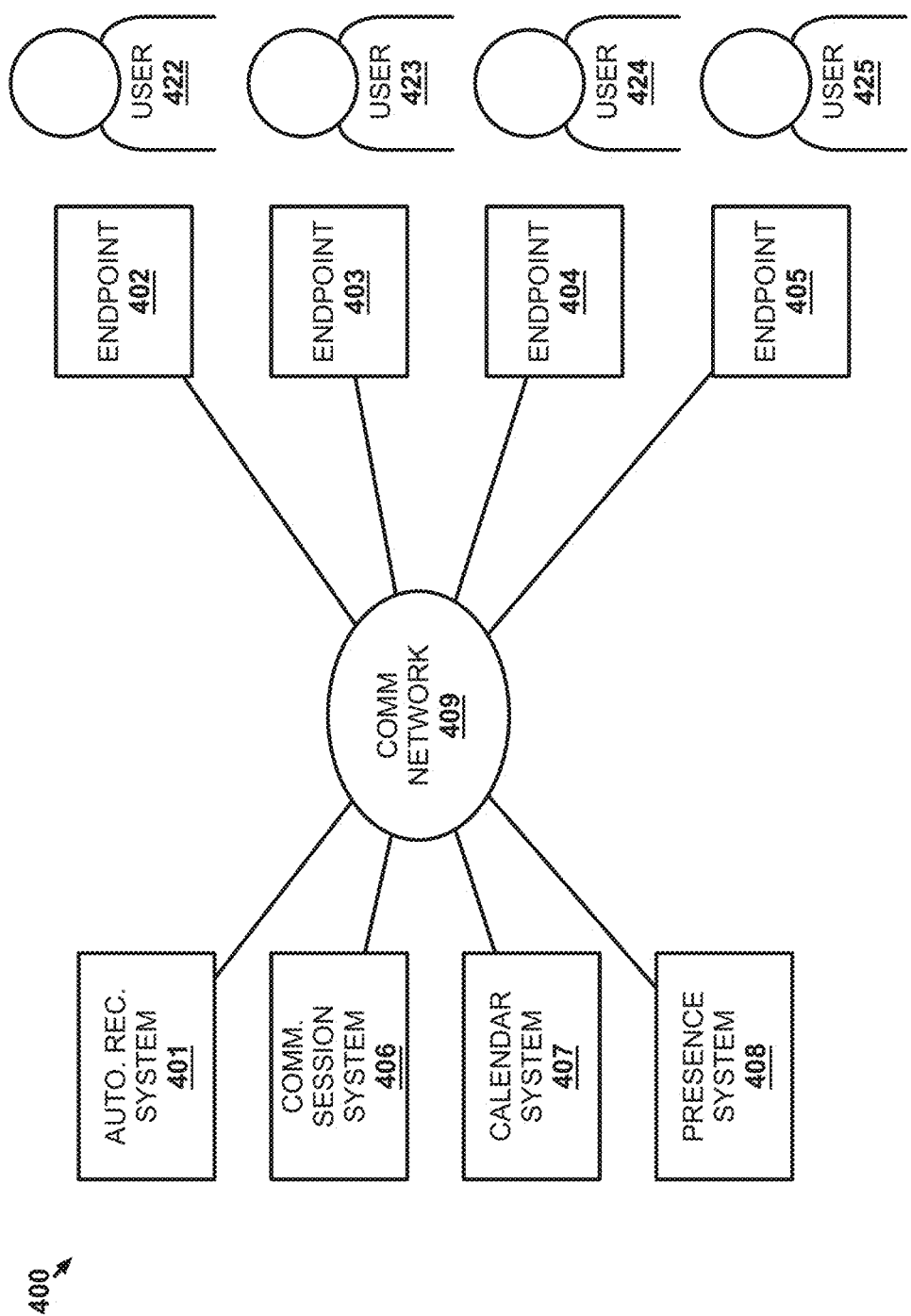
FIG. 4 illustrates an implementation for recording user communications on behalf of an absent user.

FIG. 4 illustrates implementation 400 for recording user communications on behalf of an absent user. Implementation 400 includes automated recording system 401, endpoints 402-405, communication session system 406, calendar system 407, presence system 408, and communication network 409. Communication network 409 includes one or more local area networks and/or wide area computing networks, including the Internet, over which systems 401-408 communicate. Endpoints 402-405 may each comprise a telephone, laptop computer, desktop workstation, tablet computer, conference room system, or some other type of user operable computing device. Communication session system 406 may be an audio/video conferencing server, a packet telecommunications server, a web-based presentation server, or some other type of computing system that facilitates user communication sessions between endpoints. Endpoints 402-405 may each execute a client application that enables endpoints 402-405 to join communication sessions facilitated by communication session system 406. Automated recording system 101 may also execute a similar client application to join the communication sessions as an endpoint even though, at least in this example, automated recording system 101 is a server and not a user system like endpoints 402-405. Calendar system 407 and presence system 408 are similarly computing servers that provide electronic calendar and presence services, respectively, to endpoints 402-405. In addition to recording communication sessions for meetings, automated recording system 401 facilitates notifications to other users that user 422 is going to be, or already is, on vacation and automatically reschedules calendar items (e.g., meetings, appointments, etc.) around when user 422 is on vacation.

Figure 5:
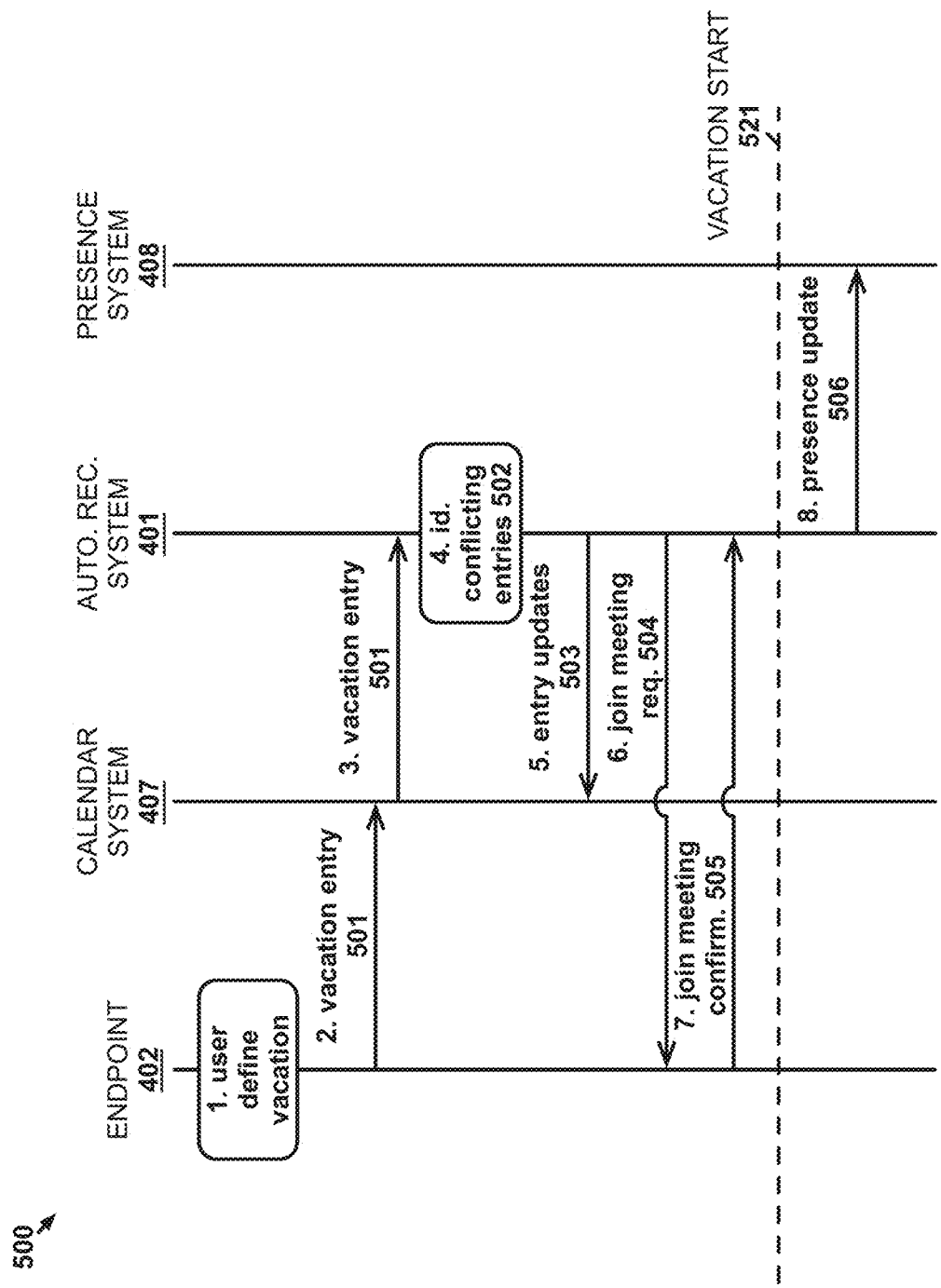
FIG. 5 illustrates an operational scenario for recording user communications on behalf of an absent user.

FIG. 5 illustrates operational scenario 500 for recording user communications on behalf of an absent user. In operational scenario 500, user 422 operates endpoint 402 to define a vacation that they want to include in their electronic calendar at step 1. In this example, the vacation is defined as vacation entry 501 for entrance into user 422's calendar. For instance, endpoint 402 may execute an application that allows user 422 to view and manage entries in their electronic calendar, which is hosted by calendar system 407. In other examples, vacations may not be entries themselves but, rather, comprise blocking off time in the calendar. Vacation entry 501 at least includes a timeframe (e.g., range of dates) when user 422 will be on vacation and, therefore, unable to attend any meetings within that range. Vacation entry 501 may further include additional information about the vacation (e.g., the location where user 422 will be going on vacation) at least for user 422's own reference within their calendar. In some examples, vacation entry 501 may require supervisor approval before vacation entry 501 can be included in user 422's calendar.

Vacation entry 501 is transmitted to calendar system 407 at step 2 and calendar system 407 includes vacation entry 501 in the electronic calendar of user 422. Vacation entry 501 may be transmitted upon user 422 finishing their definition or may be transmitted in parts as user 422 continues to define vacation entry 501 (e.g., the start time may be transmitted upon user 422 entering a start time while endpoint 402 is still waiting for user 422 to enter an end time or other information). In some examples, endpoint 402 maintains a local copy of user 422's electronic calendar (e.g., in a calendar application executing thereon) and vacation entry 501 is transferred to calendar system 407 when that local copy is synchronized with a copy on calendar system 407. In some examples, endpoint 402 may access calendar system 407 using Application Programming Interfaces (APIs) provided by calendar system 407.

Automated recording system 401 also has access to calendar system 407. For instance, user 422 may have provided automated recording system 401 with permission or credentials necessary for automated recording system 401 to access user 422 calendar stored calendar system 407. In some cases, automated recording system 401 may access the calendar using the same APIs that are used by endpoint 402 to access the calendar. After vacation entry 501 is received by calendar system 407, automated recording system 401 receives vacation entry 501 at step 3. Calendar system 407 may be configured to automatically notify and/or push calendar updates for user 422 to automated recording system 401 or automated recording system 401 may request updates therefrom. For example, automated recording system 401 may similarly synchronize a local copy of user 422's calendar to identify vacations or other times when user 422 will be unavailable. Upon recognizing from vacation entry 501 that user 422 will be unavailable during the timeframe defined in vacation entry 501, automated recording system 401 determines at step 4 whether user 422's calendar includes conflicting entries 502 that occur, at least partially, during user 422's vacation. In examples, where automated recording system 401 maintains its own local copy of user 422's calendar, automated recording system 401 may simply check for overlap of any entries in the calendar with the timeframe of vacation entry 501. In other examples, automated recording system 401 may query calendar system 407 for calendar entries that overlap the timeframe of vacation entry 501.

From conflicting entries 502, automated recording system 401 determines entry updates 503 that are sent to calendar system 407 at step 5 to update entries of conflicting entries 502 that automated recording system 401 is able to change to different times outside of the timeframe of vacation entry 501. In some examples, if an entry in conflicting entries 502 is a meeting between user 422 and one or more other participants, automated recording system 401 may query the other participants about whether they will allow automated recording system 401 to change the time of the entry. If the other participants allow (e.g., all participants, a threshold portion of the participants, or otherwise) the entry's time to be changed, automated recording system 401 includes the time change in entry updates 503. In some examples, automated recording system 401 may change the time of an entry in conflicting entries 502 that was created by user 422 regardless of whether other participants would allow the change. In further examples, automated recording system 401 may only change the time of entries that user 422 specifically indicates can be changed in the entry itself.

Other logic may also be used to determine which entries of conflicting entries 502 may be changed. When changing the time of any entry via entry updates 503, automated recording system 401 may select a next available time after the timeframe of vacation entry 501, may query other participants for preferred times, or may select a time using some other logic.

In this scenario, automated recording system 401 determines that one of conflicting entries 502 is for a meeting that cannot be moved to a different time. Other examples may identify more than one meeting entry that is handled similarly to how the meeting in this scenario is handled below. After identifying the meeting that cannot be changed, automated recording system 401 transfers join meeting request 504 at step 6 to endpoint 402. Join meeting request 504 directs endpoint 402 to query user 422 about whether user 422 wants automated recording system 401 to join communication session 601 to record user communications 602 on behalf of user 422. Endpoint 402 may execute an application for interacting with automated recording system 401 and join meeting request 504 may trigger a notification in automated recording system 401 that enables user 422 to enter their response. The response triggers endpoint 402 to transmit join meeting confirmation 505, which indicates that user 422 wants automated recording system 401 to join communication session 601, to automated recording system 401 at step 7. Alternatively, automated recording system 401 may transmit join meeting request 504 in a generic communication format (e.g., text message, email, etc.), a message over the communication platform associated with presence system 408, or join meeting request 504 may be transmitted in some other manner. In those examples, join meeting confirmation 505 may be a response in the same message format as join meeting request 504 was transferred or join meeting confirmation 505 may be transferred in some other format. In some cases, join meeting request 504 may include a link, or other element, that triggers endpoint 402 to open a webpage, or other application (e.g., the application for interacting with automated recording system 401), where user 422 can enter their response, which is transferred in join meeting confirmation 505. While join meeting confirmation 505 confirms that user 422 wants automated recording system 401 to join communication session 601 on their behalf, user 422 may instruct automated recording system 401 not to join in other examples. In some cases, automated recording system 401 may be preconfigured to either join or not join communication session 601 had user 422 not responded to join meeting request 504. Likewise, rather than querying user 422 for every conflicting meeting that cannot be moved, automated recording system 401 may be preconfigured to automatically join all meetings or only join meetings meeting certain criteria.

In response to vacation start time 521 arriving, as defined in vacation entry 501, automated recording system 401 transfers presence update 506 at step 8 to presence system 408. Presence update 506 indicates that user 422 is unavailable and, in some examples, provides information about how long user 422 will be unavailable (e.g., indicates when user 422 will return), about what is making user 422 unavailable (i.e., vacation in this example), and/or some other type of information that may be useful to other users on the communication platform associated with presence system 408. For example, should another user accessing the communication platform wish to communicate with user 422, the other user's interface to the communication platform (e.g., an platform access application) will display the presence status information indicated in presence update 506. Upon seeing that user 422 is unavailable, the other user may decide not to reach out to user 422 or, if the other user does still make an attempt (e.g., initiate a text chat or video call), the communication platform may block the attempt. In some examples, the communication session services provided by automated recording system 401 may be considered part of the communication platform for which presence system 408 tracks user presence information.

Though not shown, upon reaching vacation start time 521, automated recording system 401 may also automatically configure an auto-response to emails, or other forms of messaging, directed to user 422 during the timeframe defined by vacation entry 501 to indicate to senders that user 422 is unavailable. Automated recording system 401 may have access to incoming emails and send the auto-responses itself or may communicate with endpoint 402 or an email server system to configure the sending of the auto-response. Similarly, automated recording system 401 may update a voicemail greeting for incoming calls directed to user 422 to indicate that user 422 is unavailable. In the above examples, automated recording system 401 may automatically remove the auto-response and/or change the voicemail greeting when the end time for vacation entry 501 is reached. In further examples, automated recording system 401 may include a message within emails sent by user 422 (e.g., may update an email signature for user 422 at endpoint 402 or an email server for user 422) prior to vacation start time 521 that indicates to recipients that user 422 will be unavailable for the timeframe specified by vacation entry 501. The message may be included in emails beginning from when automated recording system 401 became aware of vacation entry 501, may be included upon reaching a threshold amount of time prior to vacation entry 501's start time, or may be included in emails for some other duration.

Figure 6:
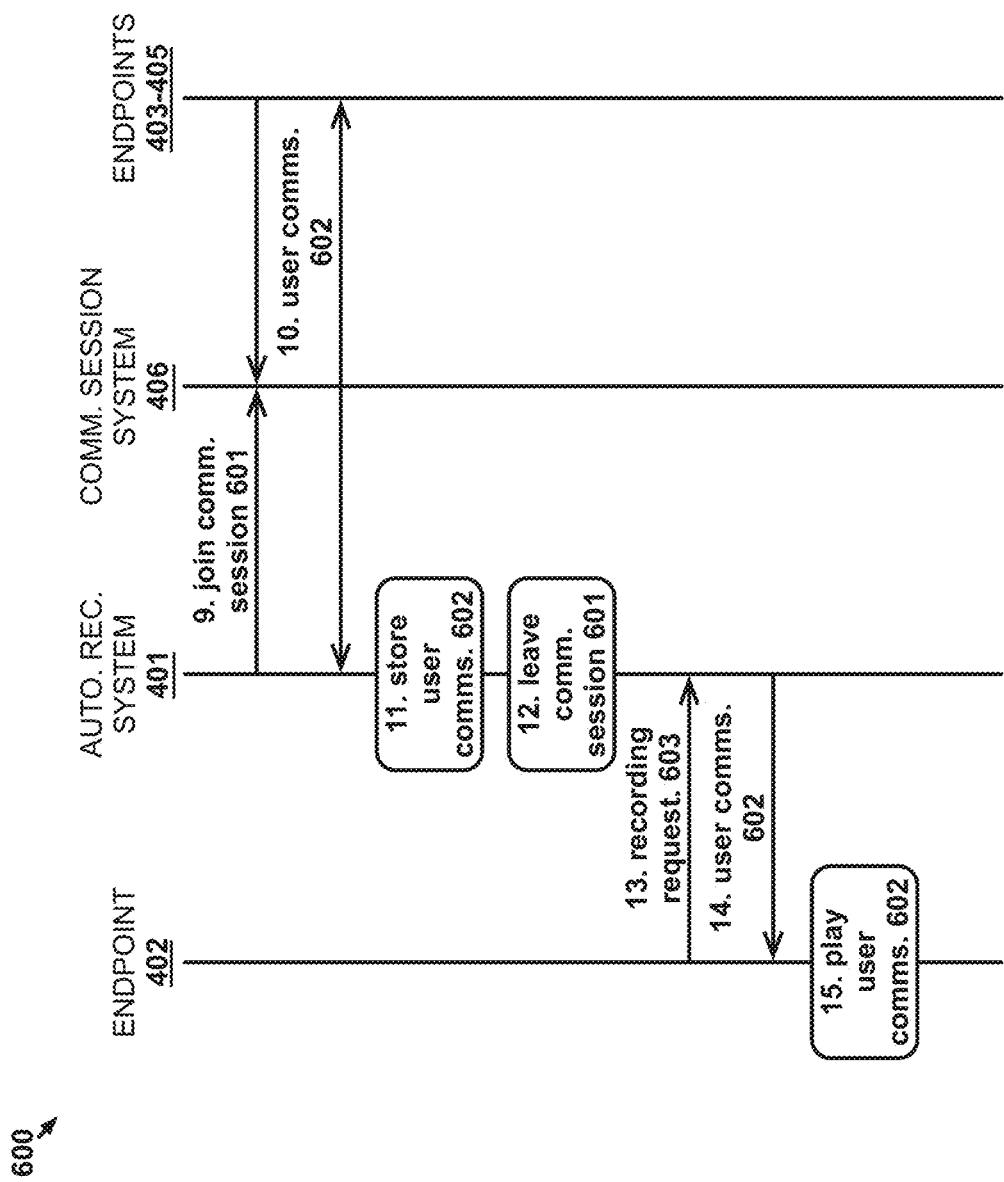
FIG. 6 illustrates another operational scenario for recording user communications on behalf of an absent user.

FIG. 6 illustrates operational scenario 600 for recording user communications on behalf of an absent user. Operational scenario 600 occurs after vacation start time 521 and is a continuation of operational scenario 500. Upon reaching the start time for the meeting that join meeting confirmation 505 instructed automated recording system 401 to join, automated recording system 401 joins communication session 601 facilitated by communication session system 406 at step 9 as an endpoint on behalf of user 422. By joining communication session 601 as an endpoint, automated recording system 401 is able to access user communications 602 without having to rely on recording features of communication session system 406 (e.g., APIs). Endpoints 403-405 are shown to also join communication session 601 at substantially the same time, although, one or more of endpoints 403-405 may join communication session 601 at other times. Automated recording system 401 may notify communication session system 406 that automated recording system 401 is associated with user 422 by providing identifying information to communication session system 406 when joining communication session system 406 (e.g., by using user 422's access credentials), which in turn notifies users 423-425 about automated recording system 401, may notify users 423-425 over communication session system 406 that automated recording system 401 has joined on behalf of automated recording system 401, or may identify itself to users 423-425 in some other manner. In some examples, automated recording system 401 may simply identify as itself and rely on users 423-425 to assume that automated recording system 401 is joining on behalf of a user not able to attend.

After joining, automated recording system 401 begins to receive user communications 602 at step 10 over communication session system 406. Automated recording system 401 does not contribute to user communications 602 in this example but, in other examples, automated recording system 401 may identify itself to users 423-425 in user communications 602. For instance, automated recording system 401 may synthesize a voice to tell users 423-425 that it is joining (and recording) the session on behalf of user 422. User communications 602 include real-time voice, video, screen sharing, text-based messages, or any other type of media that may be transferred over a communication session. Upon receiving user communications 602, automated recording system 401 stores user communications 602 at step 11 to a storage system accessible by automated recording system 401 either locally or remotely over communication network 409. At an end time for the meeting (or at least an end time for a portion of the meeting relevant to user 422) specified in vacation entry 501, automated recording system 401 leaves communication session 601 at step 12.

At a time after the meeting has ended, such as when user 422 returns from vacation or has otherwise found time in their schedule, user 422 directs endpoint 402 to transfer recording request 603 at step 13 to automated recording system 401. Recording request 603 requests playback of user communications 602 that were stored by automated recording system 401. Automated recording system 401 may require verification that user 422 is making the request (e.g., request credentials) prior to providing user communications 602. In response to recording request 603, automated recording system 401 provides user communications 602 at step 14 to endpoint 402, which plays user communications 602 to user 422 at step 15. User communications 602 may be streamed to endpoint 402 for playback, may be transferred in their entirety to endpoint 402 (e.g., endpoint 402 may download a file containing user communications 602), or may be transferred in some other manner. By experiencing the playback of user communications 602, user 422 is able to determine what they missed during the meeting.

Figure 7:
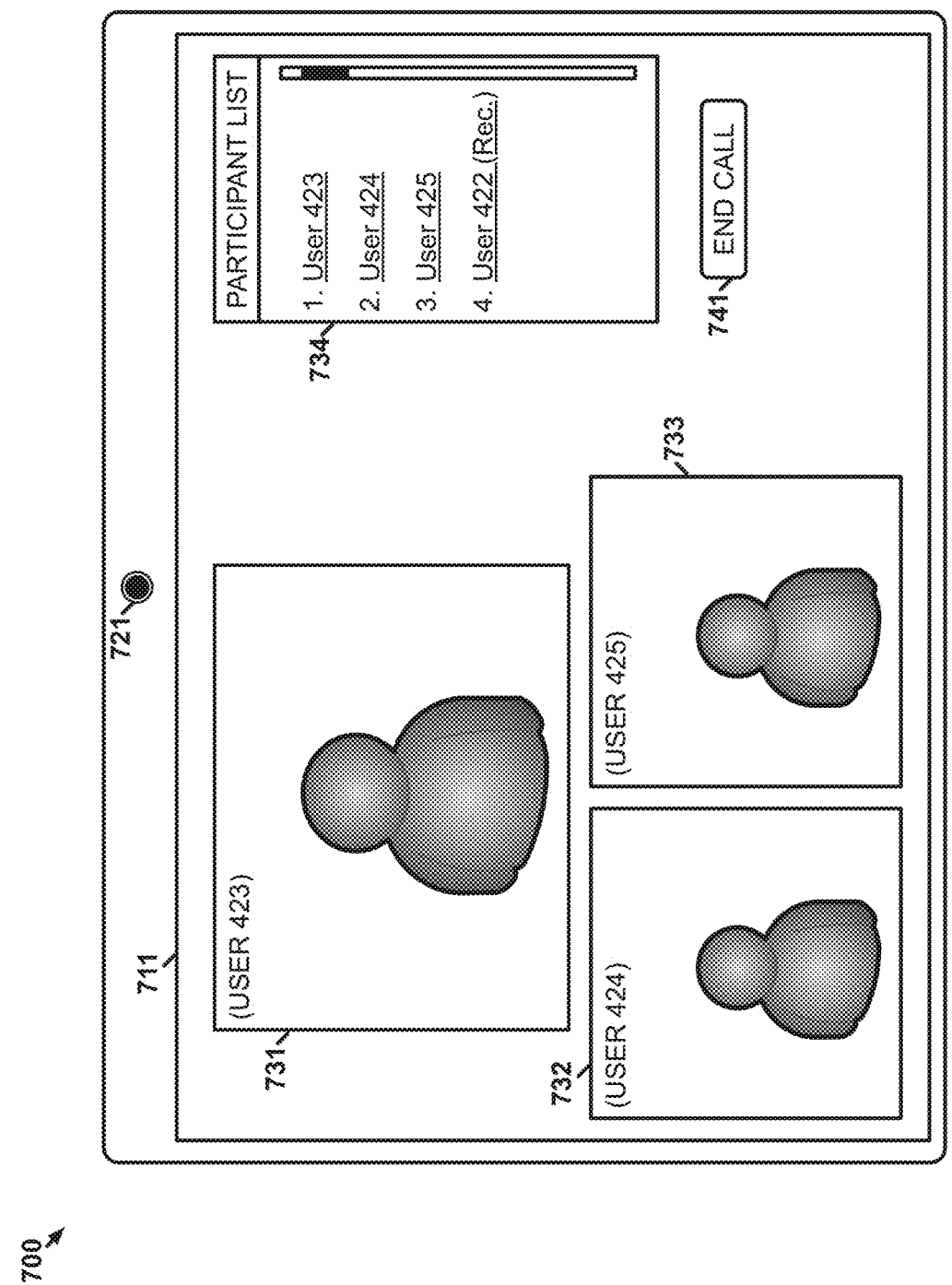
FIG. 7 illustrates a display system for recording user communications on behalf of an absent user.

FIG. 7 illustrates display system 700 for recording user communications on behalf of an absent user. Display system 700 is an example display system for endpoint 405, although, endpoint 403 and endpoint 404 may include similar display systems. Display system 700 includes display 711 and camera 721. Display 711 may be a cathode ray tube (CRT), Liquid Crystal Display (LCD), Light Emitting Diode display (LED), or some other type of display capable of presenting images described below. Camera 721 includes optics and an image sensor for capturing video of a participant viewing display 711. In some examples, display system 700 may further include a microphone and/or one or more speakers for user 425 to input and receive voice communications within user communications 602. In this example, the microphone and speakers are located elsewhere for endpoint 405 (e.g., built into a headset connected to endpoint 405).

In this example, communication session 601 is a video communication session and endpoint 405 executes a client application for connecting to communication session 601. Display 711 is displaying an example Graphical User Interface (GUI) for the client application as user 425 is participating in communication session 601. The GUI shows participant windows 731-733, participant list 734, and end call button 741, which ends endpoint 405's connection to communication session 601 when pressed. Real-time video of user 423 is shown in participant window 731, which is larger than participant window 732 and participant window 733 because user 423 is currently speaking. Participant window 732 shows real-time video of user 424 and participant window 733 shows real-time video of user 425. User 422 is not present for communication session 601 due to their vacation and, therefore, no video is captured of user 422 for inclusion in user communications 602 even if automated recording system 401 was capable of doing so. In some examples, automated recording system 401 may provide a placeholder image/video (e.g., an image of user 422, an image having text explaining that user 422 is absent, or otherwise) for user communications 602, which may be displayed by the client application if enough screen area is available for the inclusion (e.g., for communication sessions with a larger number of participants, the client application may only show the most recent or most active speakers rather than squeeze every participant into the screen space).

Participant list 734 lists users 422-425 as participants on communication session 601 even though user 422 is absent. Since automated recording system 401 connects to communication session 601 as an endpoint, automated recording system 401 may have instructed communication session system 406 to identify automated recording system 401 as being user 422's endpoint. Although, since user 422 is not actually present to participate on communication session 601, automated recording system 401 further instructs communication session system 406 to include "Rec." in parenthesis to signify to users 423-425 that user 422 is being represented by automated recording system 401. Notifying users 423-425 that automated recording system 401 is present on behalf of user 422 allows users 423-425 to potentially adjust their behavior accordingly. For instance, users 423-425 will know not to try getting user 422 involved in the conversation since user 422 cannot get involved and/or users 423-425 can pose questions or make statements over communication session 601 that they know will eventually be heard by user 422 when user communications 602 are played back.

Figure 8:
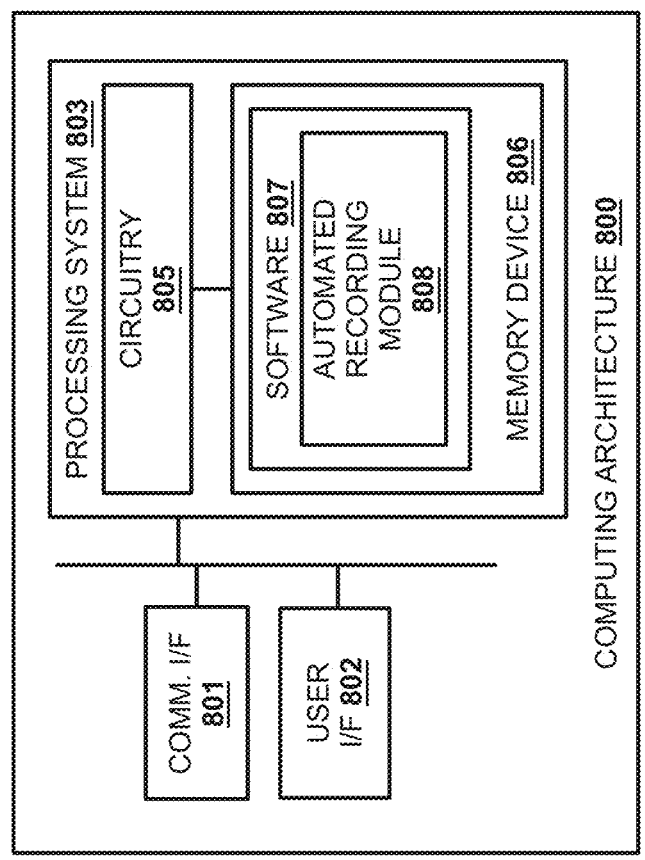
FIG. 8 illustrates a computing architecture for recording user communications on behalf of an absent user.

FIG. 8 illustrates computing architecture 800 for recording user communications on behalf of an absent user. Computing architecture 800 is an example computing architecture for automated recording systems 101 and 401, although systems 101 and 401 may use alternative configurations. Other systems described above, such as endpoints and communication session systems, may also use computing architecture 800. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes automated recording module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, automated recording module 808 directs processing system 803 to identify a meeting at a meeting time when a user is unable to attend and join a communication session for the meeting as an endpoint at the meeting time. During the communication session, automated recording module 808 directs processing system 803 to receive user communications in the automated recording system from other endpoints on the communication session. After receiving the user communications, automated recording module 808 directs processing system 803 to store the user communications to a storage system.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   identifying a meeting at a meeting time when a user is unable to attend;
   in an automated recording system at the meeting time, automatically connecting to a communication session system over a communication network to join the automated recording system as an endpoint to a communication session for the meeting, wherein the communication session system facilitates the communication session between the automated recording system and other endpoints to the communication session, wherein automatically connecting to the communication session system includes executing a client application that enables endpoints to join communication sessions or dialing into the communication session;
   during the communication session, receiving user communications in the automated recording system from the other endpoints; and
   after receiving the user communications, storing the user communications to a storage system.

2. The method of claim 1, comprising:
   joining the communication session using access credentials for the user.

3. The method of claim 1, comprising:
   identifying the automated recording system as representing the user to other users at the other endpoints.

4. The method of claim 1, comprising:
   after storing the user communications, receiving a request from the user to access the user communications; and
   providing the user communications to the user in response to the request.

5. The method of claim 1, wherein identifying the meeting comprises:
   receiving a timeframe for when the user is unavailable;
   determining whether to reschedule one or more items scheduled during the timeframe, wherein the meeting is one of the items; and
   in response to determining that the meeting cannot be rescheduled, determining that the automated recording system should join the communication session.

6. The method of claim 5, wherein determining that the automated recording system should join the communication session comprises:
   receiving user input from the user instructing the automated recording system to join the communication session.

7. The method of claim 5, comprising:
   in response to determining that a first item of the items can be rescheduled, rescheduling the first item to a time outside of the timeframe.

8. The method of claim 5, comprising:
   updating a presence status of the user to indicate that the user is unavailable during the timeframe.

9. The method of claim 1, wherein the meeting time comprises a time during the meeting that is predetermined to be associated with the user.

10. The method of claim 1, wherein the automated recording system comprises a user system operated by the user.

11. An apparatus for an automated recording system, comprising:
    one or more computer readable storage media;
    a processing system operatively coupled with the one or more computer readable storage media; and
    program instructions stored on the one or more computer readable storage media that, when read and executed by the processing system, direct the processing system to:
    identify a meeting at a meeting time when a user is unable to attend;
    at the meeting time, automatically connect to a communication session system over a communication network to join the automated recording system as an endpoint to a communication session for the meeting, wherein the communication session system facilitates the communication session between the automated recording system and other endpoints to the communication session, wherein the automated recording system automatically connects to the communication session system by executing a client application that enables endpoints to join communication sessions or dialing into the communication session;
    during the communication session, receive user communications from the other endpoints; and
    after receiving the user communications, store the user communications to a storage system.

12. The apparatus of claim 11, wherein the program instructions direct the processing system to:
    join the communication session using access credentials for the user.

13. The apparatus of claim 11, wherein the program instructions direct the processing system to:
    identify the automated recording system as representing the user to other users at the other endpoints.

14. The apparatus of claim 11, wherein the program instructions direct the processing system to:
    after storing the user communications, receive a request from the user to access the user communications; and provide the user communications to the user in response to the request.

15. The apparatus of claim 11, wherein to identify the meeting, the program instructions direct the processing system to:
  receive a timeframe for when the user is unavailable;
  determine whether to reschedule one or more items scheduled during the timeframe, wherein the meeting is one of the items; and
  in response to determining that the meeting cannot be rescheduled, determine that the automated recording system should join the communication session.

16. The apparatus of claim 15, wherein to determine that the automated recording system should join the communication session, the program instructions direct the processing system to:
  receiving user input from the user instructing the automated recording system to join the communication session.

17. The apparatus of claim 15, wherein the program instructions direct the processing system to:
  in response to determining that a first item of the items can be rescheduled, reschedule the first item to a time outside of the timeframe.

18. The apparatus of claim 15, wherein the program instructions direct the processing system to:
  update a presence status of the user to indicate that the user is unavailable during the timeframe.

19. The apparatus of claim 11, wherein the meeting time comprises a time during the meeting that is predetermined to be associated with the user.

20. One or more computer readable storage media having program instructions stored thereon for an automated recording system that, when read and executed by a processing system, direct the processing system to:
  identify a meeting at a meeting time when a user is unable to attend;
  at the meeting time, automatically connect to a communication session system over a communication network to join the automated recording system as an endpoint to a communication session for the meeting, wherein the communication session system facilitates the communication session between the automated recording system and other endpoints to the communication session, wherein the automated recording system automatically connects to the communication session system by executing a client application that enables endpoints to join communication sessions or dialing into the communication session;
  during the communication session, receive user communications from the other endpoints; and
  after receiving the user communications, store the user communications to a storage system.

* * * * *